Patented Feb. 25, 1941

2,232,712

UNITED STATES PATENT OFFICE 2,232,712

FULLY ACETYLATED SUGAR ACIDS AND PROCESSES FOR THEIR PRODUCTION

Randolph T. Major, Plainfield, N. J., and Elmer W. Cook, New York, N. Y., assignors to Merck & Co. Inc., Rahway, N. J., a corporation of New Jersey No Drawing. Application December 30, 1936, Serial No. 118,263

11 Claims. (Cl. 260—488)

This invention relates to fully acetylated sugar acids and derivatives thereof, and to processes for their production.

The principal object of our invention is to prepare fully acetylated sugar acids which will be serviceable for the preparation of acetyl derivatives of 2-keto-sugar acids, the enol forms of lactones from which have been shown to be vitamin C and its homologs. (Hirst, Chemistry & Industry, vol. 52, 1933, p. 221, and Haworth, Chemistry, vol. 52, p. 482.)

The only record in the literature of an acetylated sugar acid is that described by Upson and Bartz (Jr. Am. Chem. Soc. 53, 4226, 1931). These investigators have reported the preparation of 2, 3, 4, 6-tetra acetyl-d-gluconic acid monohydrate having a melting point of 114–117° C., and specific rotation -1.21°. However, they did not prepare the fully acetylated gluconic acid, that is, the pentaacetyl compound, and it does not appear that the fully acetylated sugar acids of this series have ever been produced heretofore.

We have now prepared these completely acetylated sugar acids through the oxidation of the appropriate aldehydo sugar acetates and by further complete acetylation of acetylated acid derivatives from corresponding $\delta$-lactones.

The oxidation of the appropriate aldehydo sugar acetate to the corresponding acetylated sugar acid is preferably carried out with slightly more than the theoretical amount of bromine in the presence of a buffer, such as calcium or barium carbonate, potassium carbonate, potassium bicarbonate, etc.

The process for the acetylation of the acetylated acid derivatives from $\delta$-lactones to their corresponding fully acetylated sugar acids comprises treating the selected acetylated acids with acetic anhydride in the presence of a catalyst, such as fused zinc chloride.

We have also produced various derivatives of the fully acetylated acids, such as, for example, the ethyl esters, the phenylhydrazides, amides, etc.

The following description of the more detailed steps of the invention exemplifies specific adaptations of the general methods set forth to the ultimate production of the completely acetylated sugar acids and their derivatives which are embraced within the scope of our invention.

PENTAACETYL GLUCONIC ACID AND ITS DERIVATIVES

*Preparation of pentaacetyl gluconic acid monohydrate through oxidation of aldehydo-d-glucose pentaacetate*

About 5 gms. of aldehydo glucose pentaacetate in 125 cc. aqueous solution is treated with 4.0 gms. of potassium bicarbonate and 2.2 gms. of bromine. After about 2 hours, 21 cc. of 1.9 n hydrochloric acid is added and the solution is extracted with chloroform. The solution is evaporated in vacuo and the pentaacetyl gluconic acid which remains is recrystallized from water in the form of the monohydrate having a melting point of about 72–73° C.;

$$(\alpha)_D^{20} = +7.5°$$

(chloroform; C,2). An acetyl determination showed five acetyl groups.

*Preparation of pentaacetyl gluconic acid monohydrate through further acetylation of acetylated acid prepared from $\delta$-gluconolactone*

About 50 gms. of $\delta$-gluconolactone are added to about 250 cc. of acetic anhydride containing 20 gms. of zinc chloride in solution at 0° C. After about 24 hours, the mixture is poured into 1000 cc. of ice-water and stirred for about 1½ hours. Tetraacetyl gluconic acid monohydrate separates, having a melting point of about 114–115° C.;

$$(\alpha)_D^{20} = -5°$$

(alcohol; c,2).

About 50 gms. of this tetraacetyl gluconic acid monohydrate are kept for 24 hours in 188 cc. of acetic anhydride containing about 18 gms. of zinc chloride in solution. The solution is poured into 1000 cc. of ice-water and, after standing, is extracted with chloroform. The solution is evaporated in vacuo, and the pentaacetyl gluconic acid which remains is recrystallized from water. The monohydrate obtained has a melting point of about 72–73° C.

*Anhydrous pentaacetyl gluconic acid*

About 50 gms. of pentaacetyl-gluconic acid monohydrate are recrystallized from absolute alcohol and dissolved in 500 cc. of hot toluene. About 100 cc. of the toluene is distilled in an oil bath. Upon cooling, anhydrous pentaacetyl gluconic acid separates. This product is filtered and then washed successively with toluene and petroleum ether. It has a melting point of 110–111°, and $$(\alpha)_D^{20} = +11.5°$$

(chloroform, C,2).

*Ethyl pentaacetyl gluconate*

About 10 gms. of pentaacetyl-d-gluconic acid are dissolved in 30 cc. of absolute alcohol containing 2% hydrogen chloride, and the solution warmed at 60° for about 4 minutes. Upon cooling and stirring, a solid crystallizes. This is filtered and washed with a little alcohol. It has a melting point of about 103–104°, and $$(\alpha)_D^{20} = +20.5$$

(chloroform, C,2). Ethyl pentaacetyl gluconate has also been prepared by us by acetylating ethyl gluconate with acetic anhydride in the presence of either pyridine or fused zinc chloride. It had the same melting point as above.

Volpert, Ber. 19, 2622 (1886) has also reported the production of an ethyl pentaacetyl gluconate having a melting point of 103:5°.

Pentaacetyl gluconic phenyl hydrazide

About 10 gms. of gluconic-phenyl-hydrazide is added to 50 cc. of acetic anhydride containing about 4 gms. of fused zinc chloride in solution. The mixture is kept cold for about 30 minutes and then allowed to stand at room temperature for about 24 hours. A gum is formed when the acetylation mixture is poured into ice-water. The mixture is extracted with chloroform and the chloroform extract washed with sodium bicarbonate in ice-water and then with water. The extract is evaporated in vacuo when the gummy residue slowly starts to crystallize. It is recrystallized from alcohol by the addition of ether accompanied by cooling. The pentaacetyl gluconic phenyl hydrazide thus obtained has a melting point of about 152–154°, and $$(\alpha)_D^{20} = +28°$$

(alcohol; c,2).

Pentaacetyl-d-gluconamide

Dry ammonia is bubbled through a solution of pentaacetyl-d-gluconic acid chloride (prepared by us for the first time and disclosed in an application being filed by us concurrently herewith) in dry ether. The precipitate which forms is washed with water to remove ammonium chloride. The pentaacetyl-d-gluconamide which remains has a melting point of about 183–184°.

During the course of our experiments, we prepared a 2,3,4,6-tetraacetyl-d-gluconic acid monohydrate through acetylation of 6-gluconolactone according to the method described by Upson and Bartz (supra). The product thus obtained by us had practically the same melting point as that reported by these previous workers, but its optical activity was different. Since Upson and Bartz did not report the solvent which they used for measuring the optical activity of their product, it seems probable that a different solvent was used by us. We obtained a tetraacetyl compound having a melting point of 114–115° and $$(\alpha)_D^{20} = -5°$$

(alcohol; c,2).

We have also produced tetraacetyl-d-gluconic acid monohydrate through the oxidation of tetraacetyl-d-glucose, as follows:

Tetraacetyl - d-gluconic acid monohydrate through oxidation of tetraacetyl-d-glucose About 5 gms. of tetraacetyl glucose is dissolved in about 125 cc. of hot water in a flask and the solution quickly cooled to room temperature. About 4.4 gms. of potassium bicarbonate are added and allowed to dissolve; 1.5 gms. of bromine are added. The flask is stoppered and shaken, the stopper being removed occasionally to relieve the pressure from the carbon dioxide. As soon as the bromine has reacted, about 0.9 gm. more of bromine is added to complete the reaction. The oxidation is completed in about 40 minutes. The solution is cooled to 0° and 23 cc. of 1.93 n hydrochloric acid is added. Upon standing, tetraacetyl gluconic acid monohydrate separates; an additional quantity can be recovered by extracting the mother liquors with chloroform. It has a melting point of 114–115° and $$(\alpha)_D^{20} = -5°$$

(alcohol; C,2).

We have also discovered an improved process for the preparation of aldehydo-d-glucose pentaacetate, which is the starting material in one of our methods for producing pentaacetyl-d-gluconic acid monohydrate. This new method involves the reduction of pentaacetyl-d-gluconyl chloride, which has been prepared by us and which is disclosed in the accompanying application being filed concurrently herewith.

Aldehydo-d-glucose pentaacetate through reduction of pentaacetyl-d-gluconyl chloride About 5 gms. of pentaacetyl-d-gluconyl chloride in 25 cc. of anhydrous xylene (dried over sodium) are heated under reflux in the presence of 2 gms. of 5% palladiumized barium sulfate. Hydrogen is passed in at such a rate that the catalyst is kept in lively suspension. The reduction is complete within 1½ hours, as shown by the absence of ammonium chloride fumes when a rod moistened with ammonium hydroxide is held in the escaping gases. Complete reduction may also be determined by passing the exit gases through water and testing for chloride ion. After reduction, the hot xylene solution is filtered. Upon cooling aldehydo-glucose pentaacetate crystallizes, and is recrystallized from xylene. It has a melting point of 117–118° and $$(\alpha)_D^{20} = -3°$$

(dry chloroform, c,2);

$$(\alpha)_D^{20} = +10°$$

(in methanol, c,2) changing slowly in the dextro direction.

TETRAACETYL XYLONIC ACID

Tetraacetyl xylonic acid through oxidation of aldehydo xylose tetraacetate

About 18.7 gms. of aldehydo-xylose-tetraacetate are dissolved in a flask containing about 400 cc. of warm water at 50°, and the solution quickly cooled to room temperature. About 10.5 gms. of bromine are added, followed by about 9.5 gms. of calcium carbonate. The mixture is stirred occasionally and the oxidation is nearly complete after two hours. The mixture is extracted with chloroform to remove any unreacted aldehydo-xylose-tetraacetate. It is then made acid with 104 cc. of 1.9 n hydrochloric acid and extracted with chloroform. The extract is dried over calcium chloride and evaporated in vacuo to a gum. Petroleum ether is added and upon stirring tetraacetyl xylonic acid crystallizes. It is recrystallized from benzene.

Tetraacetyl-d-xylonic acid has a melting point of about 86–88°, and $$(\alpha)_D^{20} = +5°$$

(alcohol, c,2);

$$\alpha_D^{20} = -2°$$

(dry chloroform; c,2).

Tetraacetyl-l-xylonic acid has a melting point of about 86–88°; and $$(\alpha)_D^{20} = -4.5°$$

(alcohol, c,2).

Tetraacetyl-d, l-xylonic acid has a melting point of about 134–135°, and $$(\alpha)_D^{20}\ 0°$$

(alcohol, c,2).

A mixture of equal quantities of tetraacetyl-d-xylonic acid and tetraacetyl-l-xylonic acid crystallized from toluene, also melted at 134–135°.

*Ethyl tetraacetyl-d,l-xylonate*

This ester has a melting point of about 70–72°, and $$(\alpha)_D^{20} \; 0°$$

(alcohol; c,0.06).

*Tetraacetyl-d,l-xylonamide*

This compound is prepared in the same way as pentaacetyl-d-gluconamide except that it does not precipitate from the ether with the ammonium chloride but can be recovered from the ether filtrate by evaporation. It is recrystallized from benzene. It has a melting point of 130–132°, and $$(\alpha)_D^{20} \; 0°$$

(chloroform, c,0.05).

Aldehydo-1-xylose tetraacetate, used as starting material in our above described method of preparing tetraacetyl-l-xylonic acid, has been prepared as follows:

*Aldehydo-l-xylose tetraacetate*

About 51 gms. of l-xylose triacetate are added to a warm alcoholic solution containing a 10% excess of semicarbazide. After warming for 15 or 20 minutes, the solution is evaporated in vacuo to a gum. The gum is dissolved in 86 cc. of pyridine and treated with 57 cc. of acetic anhydride accompanied by cooling. After standing for about 24 hours at room temperature, the solution is poured into ice-water. The mixture is allowed to stand an hour and then extracted with chloroform, and the extract is washed successively with cold dilute sulfuric acid, sodium bicarbonate and water. It is dried over calcium chloride and evaporated in vacuo to a gum. The gum is refluxed for 20 minutes in a solution of 6.5 gms. of oxalic acid in 250 cc. of methanol. The gum obtained by evaporation in vacuo is dissolved in 800 cc. of water; 75 gms. of sodium nitrite in 200 cc. of water is added. Accompanied by slow stirring and cooling to 15–20°, about 180 cc. of 6-normal hydrochloric acid is gradually added. This is followed by portionwise addition of 60 gms. of sodium nitrite, and the gradual addition of 120 cc. of 6-normal hydrochloric acid. Again 60 gms. of sodium nitrite are added and 120 cc. of 6-normal hydrochloric acid. Finally, 60 gms. of sodium nitrite are added and the solution stirred vigorously with norite. The mixture is filtered and the filtrate extracted with chloroform. The extract is dried over calcium chloride and evaporated in vacuo. Aldehydo-l-xylose tetraacetate crystallizes out with the addition of dry ether, is filtered, and recrystallized from dry ether. It has a melting point of 90–91°, and $$(\alpha)_D^{20} = +22.5°$$

(dry chloroform; c,2). Aldehydo-d and d,l-xylose tetraacetate have been made by similar processes.

*d-Xylose semicarbazone tetraacetate*

About 26 gms. of finely powdered d-xylose semicarbazone are stirred into 180 cc. of pyridine and 120 cc. of acetic anhydride at 60–70° for about six hours. The xylose semicarbazone dissolves, and the solution is permitted to stand at room temperature for from 24 to 48 hours, or until a crystalline material separates. The acetylation mixture is poured into ice-water and after standing for about an hour is extracted with chloroform. The extract is washed successively with cold dilute sulfuric acid, sodium bicarbonate, and ice water. It is dried over calcium chloride and evaporated in vacuo, and the residue is crystallized from absolute alcohol. The product is the same as that separated from the acetylation mixture. It is recrystallized from absolute alcohol, and melts at about 232–233°, $$(\alpha)_D^{20} = +21°$$

(methanol; c,1).

The mother liquors from this tetraacetate give a syrup which, on treatment with dilute nitrous acid, yields aldehydo-d-xylose-tetraacetate.

We claim as our invention:

1. Fully acetylated sugar acids which do not contain a keto group.
2. Pentaacetyl-gluconic acid.
3. Tetraacetyl-d-l-xylonic acid.
4. Processes for the production of fully acetylated sugar acids from corresponding aldehydo sugar acetates and corresponding δ-lactones which comprise, respectively, oxidation of the aldehydo sugar acetates with an oxidizing agent in the presence of a buffer agent and further acetylation of the acetylated acid from the δ-lactone by treatment with acetic anhydride containing a catalyst for the reaction.
5. A process for the production of fully acetylated sugar acids from corresponding aldehydo sugar acetates, which comprises the oxidation of the appropriate aldehydo sugar acetate with an excess of bromine, in the presence of a buffer agent.
6. A process for the production of fully acetylated sugar acids from corresponding δ-γ-lactones, which comprises treating the selected δ-γ-lactone with acetic anhydride in the presence of a catalyst, treating with water and completely acetylating the acetylated acid thus obtained by treatment with acetic anhydride containing a catalyst for the reaction.
7. A process for the production of pentaacetyl-d-gluconic acid monohydrate which comprises oxidation of aldehydo-glucose pentaacetate with an oxidizing agent in the presence of a buffer agent.
8. A process for the production of pentaacetyl-d-gluconic acid monohydrate which comprises acetylating δ-γ-glucono-lactone by treatment with acetic anhydride containing zinc chloride, treating with water and then further acetylating the tetraacetyl-gluconic acid monohydrate thus obtained by treatment with acetic anhydride containing zinc chloride.
9. A process for the production of tetraacetyl-d,l-xylonic-acid monohydrate, which comprises the oxidation of aldehydo-xylose-tetraacetate with bromine in the presence of a buffer agent.
10. A process for the production of tetraacetyl-xylonic acids which comprises the oxidation of aldehydo-xylose-tetraacetate with bromine in the presence of a buffer agent.
11. Optical isomers of tetraacetyl-xylonic acid.

RANDOLPH T. MAJOR.
ELMER W. COOK.